United States Patent [19]

Kurabayashi et al.

[11] Patent Number: 5,065,286
[45] Date of Patent: Nov. 12, 1991

[54] ELECTRICAL DOUBLE-LAYER CAPACITOR

[75] Inventors: Ken Kurabayashi, Chigasaki; Seiichiro Kitou, Ayase; Yoshinobu Tsuchiya, Fujisawa; Yoriaki Niida, Yamato, all of Japan

[73] Assignee: Isuzu Motors Limited, Tokyo, Japan

[21] Appl. No.: 604,507

[22] Filed: Oct. 29, 1990

[30] Foreign Application Priority Data

Jan. 30, 1990 [JP] Japan .................................. 2-19948

[51] Int. Cl.$^5$ ................................................ H01G 9/02
[52] U.S. Cl. ...................................................... 361/502
[58] Field of Search ........................................ 361/502

[56] References Cited

U.S. PATENT DOCUMENTS

| | | | |
|---|---|---|---|
| 3,536,963 | 10/1970 | Boos | 361/502 |
| 4,542,444 | 9/1985 | Boland | 361/502 |
| 4,783,723 | 11/1988 | Watanabe et al. | 361/502 |
| 4,803,597 | 2/1989 | Watanabe et al. | 361/502 |

Primary Examiner—Donald A. Griffin

Attorney, Agent, or Firm—Spencer & Frank

[57] ABSTRACT

A gasket (4) or collecting electrodes (1) are used as members for separating the inside from the outside of an electrical double-layer capacitor and small holes (5) are provided therein through which the internal air is drawn. Thus the internal pressure becomes lower than the atmospheric pressure and the pressure difference is generated between the inside and the outside.

Due to this pressure difference, collecting electrodes (1) are pressed to solid polarizing electrodes (2). Hence the resistance in the contacts between the collecting electrodes and the solid polarizing electrodes can be reduced. Since the contact force is obtained by the pressure difference between the inside and the outside, the contact force is applied equally to every part of the contacts. As a result, there is no contact where its contact resistance is not reduced.

Further, there is no need of provision of any device for generating the contact force outside the electrical double-layer capacitor.

1 Claim, 1 Drawing Sheet

ELECTRICAL DOUBLE-LAYER CAPACITOR

TECHNICAL FIELD

The present invention relates to an electrical double-layer capacitor having a reduced internal resistance.

BACKGROUND ART

In electrical double-layer capacitors, there is one using paste-like polarizing electrodes obtained by mixing activated carbon particles with electrolyte (dilute sulfuric acid, for example) for its polarizing electrodes, and there is also one using a solid polarizing electrode made of activated carbon solidified by baking or sintering and impregnated with electrolyte.

FIG. 2 is a view showing a conventional electrical double-layer capacitor using such solid polarizing electrode. In FIG. 2, numeral 1 denotes collecting electrodes, 2 solid polarizing electrodes, 3 is a separator, and 4 is a gasket.

For the collecting electrodes 1, conductive rubber is used, for example. The separator 3 has property that it allows ions to pass therethrough but not electrons, and a porous plastic, for example, is used therefor. The gasket 4 is provided to insulate the solid polarizing electrodes 2 from its surrounding members, and insulating rubber, for example, is used therefor.

FIG. 3 is a sectional plan view taken along line X—X of FIG. 2 showing the conventional double-layer capacitor. The reference marks correspond to those shown in FIG. 3.

This example has a structure that a plurality of solid polarizing electrodes 2 face each other across the separator 3, and the collecting electrodes 1 are disposed in contact with the outer surfaces of the solid polarizing electrodes 2. Subsequently each of the solid polarizing electrodes 2 is impregnated with electrolyte and the spaces between them are filled with the remainder of the electrolyte for impregnation.

The solid polarizing electrodes have a bulk density (grams per 1 $cm^3$) of activated carbon particles ($0.5 \sim 0.7$ $g/cm^3$) greater than those of paste-like polarizing electrodes. Hence its capacitance is greater. The solid polarizing electrode is easier to handle because of its solidity, having advantages such as a high operativity in manufacturing.

An electrical double-layer capacitor, such as this, has an internal resistance due to the resistance existing in parts where the collecting electrodes 1 are in contact with the solid polarizing electrodes 2, and the resistance of the solid polarizing electrodes 2 themselves. It is desirable for a capacitor to have its internal resistance as small as possible. However, as far as the solid polarizing electrodes 2 are employed, the resistance that the solid polarizing electrodes 2 themselves possess must be accepted.

Therefore, in order to reduce the internal resistance, it is necessary to minimize the resistance in the above parts. Therefore, the contacts between the collecting electrodes 1 and the solid polarizing electrodes 2 should be improved by application of pressure using a mechanical force exerted from the outside of the collecting electrodes 1 (from both the top and bottom thereof in FIG. 2) by caulking the edge of a metal casing (not shown), or by another method.

As a literature regarding an electrical double-layer capacitor using solid polarizing electrodes, Japanese Patent Publication No. 24100/1979 is an example.

PROBLEMS

However, there are encountered the following problems in the conventional electrical double-layer capacitors.

The first problem is that the contact resistance of some conventional electrical double-layer capcitors cannot be reduced sufficiently.

The second problem is that a means for generating a mechanical force must be arranged on the outside of the electrical double-layer capacitor and its size is accordingly larger.

DESCRIPTION OF THE PROBLEMS

Since the second problem is self-explanatory, only the first problem will subseqnently be described.

In the case of the pressure applied from outside by a mechanical force, there are inevitably variations in the pressure applied to each solid polarizing electrode 2 due to the dimensional deviations (slight difference in height, for example) of each of the solid polarizing electrodes 2 or due to the difference in distance from the point where the pressure is applied. Hence, in some cases, the contact resistance cannot be reduced sufficiently.

The subject of the present invention is to solve these problems.

DISCLOSURE OF INVENTION

The object of the present invention is to make it possible to apply a sufficient contact force to every part where the collecting electrodes and the solid polarizing electrodes are in contact with each other without externary installing a device for applying a mechanical force to the electrical double-layer capacitor.

With a view to achieving such purpose, the present invention provides an electrical double-layer capacitor wherein members for separating the interior and the exterior apart are provided with small holes which can be sealed after the internal air is drawn.

These and other objects of the invention will become more apparent in the detailed description and examples which follow.

BEST MODE OF CARRYING OUT THE INVENTION

With reference to the accompanying drawings, an embodiment according to the present invention will subsequently be described.

Figure 1:
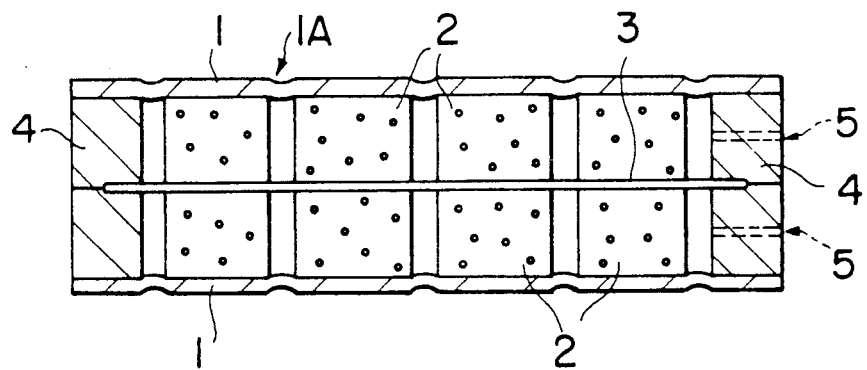
FIG. 1 an electrical double-layer capacitor of an embodiment according to the present invention.
Figure 2:
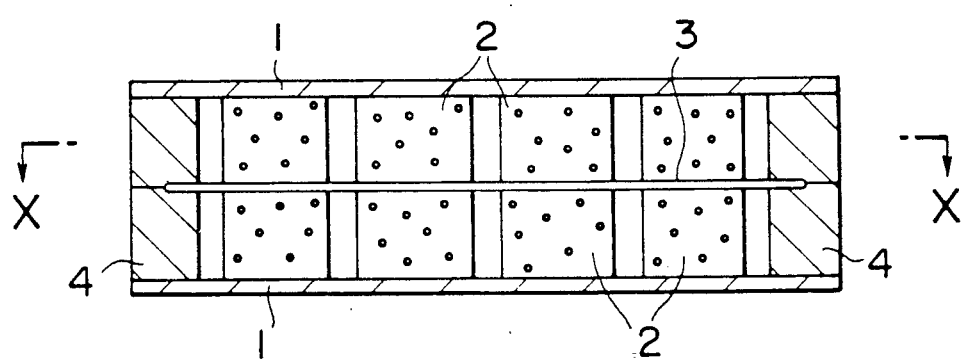
FIG. 2 a conventional electrical double-layer capacitor.
Figure 3:
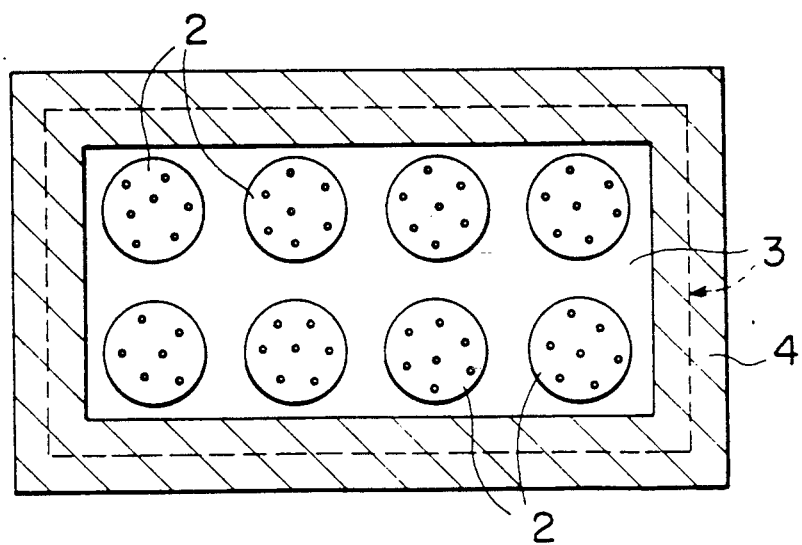
FIG. 3 a sectional plan view of the conventional electrical double-layer capacitor.

FIG. 1 is a view showing an embodiment of an electrical double-layer capacitor according to the present invention. The reference marks correspond to those shown in FIG. 2, and a mark 1A denotes dents and 5, small holes.

The small holes 5 are through holes provided from the outside of the gasket 4 to the inside. One of small holes 5 is above the separator 3 and the other below the same. In other words, this embodiment selects the gasket 4 as a member for separating the inside of the electrical double-layer capacitor from the outside thereof, in which the small holes 5 are provided respectively.

After forming the electrical double-layer capacitor by combining the collecting electrodes 1, the solid polarizing electrodes 2, the separator 3, and the gasket 4, a thin pipe such as an injection needle is inserted into the small holes 5 to draw the internal air. The small holes 5 are filled in with rubber adhesive for sealing.

When the air is exhausted, the collecting electrodes 1 are strongly pressed to the solid polarizing electrodes 2 due to the pressure difference generated between the inside of the capacitor and the outside. The parts of the collecting electrodes 1 between the solid polarizing electrodes 2 are the dents 1A. The dents are formed because of the pressure difference.

Since the pressure difference between the inside and the outside is equally applied to every contact, the contact resistance can be reduced equally in each of the contacts. In other words, there is no contact where such reduction is insufficient as compared with that in other contacts.

The small holes 5 are arranged above and below the separator 3 respectively because such an arrangement of one small hole for drawing the air between the upper collecting electrode 1 and the separator 3 and the other one for drawing the air between the lower collecting electrode 1 and the separator 3 respectively enable the air to be drawn more quickly.

In this respect, it is possible to impregnate the solid polarizing electrodes 2 with electrolyte by injecting it through the small holes 5 after the air is drawn. In this way, the electrolyte can be impregnated quickly and completely in every part of the solid polarizing electrodes 2. Consequently the operativity in manufacturing can be improved and at the same time the performance is upgraded.

In the above example, although the gasket 4 provided with small holes 5 is selected as "members for separating the inside from the outside (of the electrical double-layer capacitor)", the collecting electrodes 1 can be used as such members.

According to the present invention, there is no need of any device provided outside the electrical double-layer capacitor to apply a mechanical force because the draw of the internal air from the electrical double-layer capacitor enables the contact force to be generated.

Although the invention has been described in its prefered form with a certain degree of particularity, it is understood that the present disclosure of the preferred form has been changed in the details of construction and the combination and arrangement of parts may be resorted to without departing from the spirit and the scope of the invention as hereinafter claimed.

We claim:
1. An electrical double-layer capacitor characterized in that small holes, which can be sealed after the draw of the internal air, is provided in members for separating the inside of the capacitor from the outside.

* * * * *